Patented Sept. 20, 1949

2,482,706

UNITED STATES PATENT OFFICE 2,482,706

ALLYL ESTER OF ISOPROPYLIDENE BIS P-PHENOXYACETIC ACID

Harold M. Day, Stamford, Conn., assignor to American Cyanamid Company, New York, N. Y., a corporation of Maine No Drawing. Application October 27, 1948, Serial No. 56,903

1 Claim. (Cl. 260—473)

This invention relates to a new chemical compound and to a process according to which this compound is prepared. More particularly, the invention relates to the allyl ester of a high molecular weight dicarboxylic acid.

The compound of the present invention may be represented by the following formula:

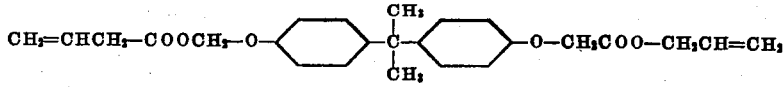

It is prepared by esterifying isopropylidene di(p-phenoxyacetic acid) with allyl alcohol.

The invention will be described in greater detail in conjunction with the following specific example in which the proportions are given in parts by weight. It should be understood that the example is merely illustrative, and it is not intended to limit the scope of the invention to the details therein set forth.

Example 35 parts (0.1 mol) of isopropylidene di(p-phenoxyacetic acid)
20 parts (excess of 0.2 mol) of allyl alcohol
173 parts of toluene
0.02 part of copper
0.25 part of toluene sulfonic acid A mixture of the reactants is placed in a suitable vessel and heated under reflux over a water trap until no more water is collected. 5.2 parts of water is obtained. The toluene is then removed by heating to 150° C. under reduced pressure, and a white solid which is the diallyl ester of isopropylidene di(p-phenoxyacetic acid) is obtained.

The isopropylidene di(p-phenoxyacetic acid) used in the preceding example may be prepared by reacting two mols of chloracetic acid with one mol of isopropylidene diphenol, for example, according to the process described and claimed in the copending application of Margaret H. Bradley and myself, Serial No. 44,804 filed August 17, 1948.

The product of the present invention may be prepared in either aqueous or alcoholic media.

Other esterification catalysts than the toluene sulfonic acid of the example may be used. Some examples of such other catalysts include concentrated sulfuric acid, β-naphthalene sulfonic acid, concentrated hydrochloric acid, and the like.

The copper used in the example to inhibit polymerization of the allyl alcohol and/or the allyl ester may be omitted or it may be replaced by other inhibitors such as, for example, hydroquinone, tert. butyl catechol, m-phenylenediamine, etc.

The product of the present invention is particularly suitable for copolymerization with unsaturated alkyd resins to produce resinous copolymers which are useful in adhesive, moldings, laminating and like compositions. In view of the high molecular weight of the diallyl ester of the present invention, copolymers prepared therefrom have relatively low dielectric constants and accordingly, very desirable electrical properties. Copolymerization may be conducted, for example, in accordance with the teachings of U. S. Patents Nos. 2,443,739 and 2,443,740.

I claim:

The diallyl ester of isopropylidene di(p-phenoxyacetic acid) having the formula:

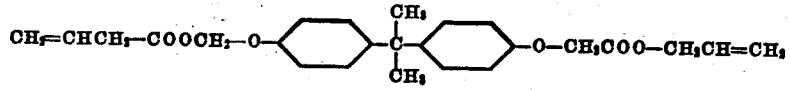

HAROLD M. DAY.

No references cited.